(12) United States Patent
Nakazawa

(10) Patent No.: US 12,456,141 B2
(45) Date of Patent: Oct. 28, 2025

(54) DEVICE AND METHOD FOR SELLING INFORMATION PROCESSING DEVICE

(71) Applicant: SINTOKOGIO, LTD., Nagoya (JP)

(72) Inventor: Kazuya Nakazawa, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 296 days.

(21) Appl. No.: 17/580,763

(22) Filed: Jan. 21, 2022

(65) Prior Publication Data

US 2022/0237684 A1 Jul. 28, 2022

(30) Foreign Application Priority Data

Jan. 27, 2021 (JP) .................. 2021-011237
Jun. 25, 2021 (JP) .................. 2021-106033

(51) Int. Cl.
*G06Q 30/0601* (2023.01)
(52) U.S. Cl.
CPC ..... *G06Q 30/0631* (2013.01); *G06Q 30/0621* (2013.01)
(58) Field of Classification Search
CPC .... G06F 3/14; G06Q 30/0621; H04L 63/0281
See application file for complete search history.

(56) References Cited

U.S. PATENT DOCUMENTS

| | | | |
|---|---|---|---|
| 8,063,750 B2 | 11/2011 | Knibbe | |
| 9,970,757 B2 | 5/2018 | Das et al. | |
| 10,387,392 B2 | 8/2019 | Bliss et al. | |
| 10,754,329 B2 | 8/2020 | Jundt et al. | |
| 11,200,774 B2 | 12/2021 | Erestam | |
| 11,775,081 B2 | 10/2023 | Nakazawa et al. | |
| 2006/0066626 A1 | 3/2006 | Kainuma | |

(Continued)

FOREIGN PATENT DOCUMENTS

| JP | S61-90204 A | 5/1986 |
|---|---|---|
| JP | H11-288304 A | 10/1999 |

(Continued)

OTHER PUBLICATIONS

Morreale, P., System design and analysis of a web-based application for sensor network data integration and real-time presentation , Mar. 1, 2009, 2009 3rd Annual IEEE Systems Conference, pp. 201-204 (Year: 2009).*

(Continued)

*Primary Examiner* — Kelly S. Campen
*Assistant Examiner* — Timothy J Kang
(74) *Attorney, Agent, or Firm* — Harness, Dickey & Pierce, P.L.C.

(57) ABSTRACT

A sales device is a sales device for selling an information processing device that is configured to collect data from at least one of a sensor and a piece of accessory equipment and provide the data to a controller included in a piece of main equipment, the sales device including a processor configured to carry out: a first process of receiving a user operation for specifying a type of the at least one of the sensor and the piece of accessory equipment; and a second process of receiving a user operation for specifying a memory area which is included in the controller and in which the data collected from the at least one of the sensor and the piece of accessory equipment specified in the first process is to be recorded.

5 Claims, 12 Drawing Sheets

(56) References Cited

U.S. PATENT DOCUMENTS

| | | |
|---|---|---|
| 2008/0077618 A1 | 3/2008 | Wang et al. |
| 2010/0231363 A1 | 9/2010 | Knibbe |
| 2012/0035746 A1 | 2/2012 | Broom |
| 2012/0208605 A1 | 8/2012 | Strauss et al. |
| 2012/0217129 A1 | 8/2012 | Tsutsumi et al. |
| 2015/0192414 A1 | 7/2015 | Das et al. |
| 2015/0251102 A1 | 9/2015 | Kuo |
| 2017/0124633 A1 | 5/2017 | Natarajan et al. |
| 2017/0141933 A1 | 5/2017 | Senda et al. |
| 2017/0337226 A1 | 11/2017 | Bliss et al. |
| 2018/0158314 A1 | 6/2018 | Larsson |
| 2018/0217581 A1 | 8/2018 | Jundt et al. |
| 2018/0306609 A1 | 10/2018 | Agarwal et al. |
| 2019/0088069 A1 | 3/2019 | Erestam |
| 2019/0235478 A1 | 8/2019 | Nakamoto et al. |
| 2019/0314243 A1 | 10/2019 | MacCallum et al. |
| 2019/0333129 A1* | 10/2019 | Taniguchi .......... G06Q 30/0633 |
| 2020/0101937 A1* | 4/2020 | Skikun .................... F41A 23/26 |
| 2020/0334763 A1 | 10/2020 | Luciani |
| 2020/0405228 A1 | 12/2020 | Svanegaard et al. |
| 2021/0073449 A1* | 3/2021 | Segev .................... G06F 30/27 |
| 2021/0107679 A1* | 4/2021 | Dunning ................ G06Q 50/40 |
| 2022/0035331 A1 | 2/2022 | Kobayashi |
| 2022/0043702 A1 | 2/2022 | Haines |
| 2022/0173922 A1 | 6/2022 | Yoneda et al. |
| 2022/0230526 A1 | 7/2022 | Akatsuka et al. |
| 2022/0236713 A1 | 7/2022 | Nakazawa et al. |
| 2022/0236812 A1 | 7/2022 | Nakazawa et al. |

FOREIGN PATENT DOCUMENTS

| | | | |
|---|---|---|---|
| JP | 2002-073152 | A | 3/2002 |
| JP | 2002-316292 | A | 10/2002 |
| JP | 2003-141662 | A | 5/2003 |
| JP | 2003-273875 | A | 9/2003 |
| JP | 2006-99568 | A | 4/2006 |
| JP | 2006-215999 | A | 8/2006 |
| JP | 2007-27889 | A | 2/2007 |
| JP | 2011-164966 | A | 8/2011 |
| JP | 4766926 | B2 | 9/2011 |
| JP | 2012-176457 | A | 9/2012 |
| JP | 2016-58011 | A | 4/2016 |
| JP | 2016-105219 | A | 6/2016 |
| JP | 2017-092792 | A | 5/2017 |
| JP | 2017-211767 | A | 11/2017 |
| JP | 2017-219926 | A | 12/2017 |
| JP | 2018-60365 | A | 4/2018 |
| JP | 2018-536228 | A | 12/2018 |
| JP | 2019-133477 | A | 8/2019 |
| JP | 2020-57332 | A | 4/2020 |
| JP | 2020-150485 | A | 9/2020 |
| WO | 2018/070088 | A1 | 4/2018 |
| WO | 2019/187115 | A1 | 10/2019 |
| WO | 2020/240939 | A1 | 12/2020 |

OTHER PUBLICATIONS

U.S. Office Action for copending U.S. Appl. No. 17/581,009 mailed Oct. 13, 2023.
Extended European Search Report for EP Application No. 22153409.2 dated Jun. 17, 2022.
Extended European Search Report for EP Application No. 22153413.4 dated Jun. 17, 2022.
Extended European Search Report for EP Application No. 22153281.5 dated Jun. 15, 2022.
Extended European Search Report for EP Application No. 22153296.3 dated Jun. 15, 2022.
U.S. Office Action for corresponding U.S. Appl. No. 17/582,268 mailed Nov. 25, 2022.
U.S. Appl. No. 17/582,121, filed Jan. 24, 2022.
U.S. Appl. No. 17/581,009, filed Jan. 21, 2022.
U.S. Appl. No. 17/582,268, filed Jan. 24, 2022.
U.S. Office Action for corresponding U.S. Appl. No. 17/581,009 mailed May 10, 2023.
European Office Action for European Patent Application No. 22153281.5 mailed on Mar. 21, 2024.
European Office Action for European Patent Application No. 22153413.4 mailed on Mar. 21, 2024.
European Office Action for European Patent Application No. 22153296.3 mailed on Apr. 17, 2024.
U.S. Office Action for corresponding U.S. Appl. No. 17/582,121 mailed Mar. 14, 2024.
U.S. Office Action for corresponding U.S. Appl. No. 17/582,121 mailed Aug. 20, 2024.
U.S. Office Action for corresponding U.S. Appl. No. 17/582,121 mailed Dec. 4, 2024.
Japanese Office Action for Japanese Patent Application No. 2021-106033 issued on Dec. 10, 2024 and English machine translation thereof.
Japanese Office Action for Japanese Patent Application No. 2021-171937 issued on May 7, 2025 and English machine translation thereof.
Japanese Office Action for Japanese Patent Application No. 2021-171936 issued on Apr. 15, 2025 and English machine translation thereof.
Japanese Office Action for Japanese Patent Application No. 2021-171935 issued on Apr. 15, 2025 and English machine translation thereof.
Office Action dated Sep. 24, 2024 issued in Japanese patent application No. 2021-171936.
Office Action dated Sep. 24, 2025 issued in Japanese patent application No. 2021-171935.

* cited by examiner

FIG. 4

```
                                                         ,-400
┌─────────────────────────────────────────────────────────┐
│ * Enter client information                              │
│                                                         │
│     Name of person      ┌──────────────────────┐ ,-401  │
│     in charge           └──────────────────────┘        │
│                                                         │
│                         ┌──────────────────────┐ ,-402  │
│     Email address       └──────────────────────┘        │
│                                                         │
│     Re-enter email      ┌──────────────────────┐ ,-403  │
│     address             └──────────────────────┘        │
│                                                         │
│                         ┌──────────────────────┐ ,-404  │
│     Telephone number    └──────────────────────┘        │
│                                                         │
│                         ┌──────────────────────┐ ,-405  │
│     Company name        └──────────────────────┘        │
│                                                 ,-406   │
│                                          ┌──────┐       │
│                                          │ Next │       │
│                                          └──────┘       │
└─────────────────────────────────────────────────────────┘
```

FIG. 5

```
                                                    ,-500
┌────────────────────────────────────────────────────────┐
│ * Specify source from which to purchase sensor         │
│      ,-501                                             │
│     ☐   Sourced by client                              │
│                                                        │
│      ,-502                                             │
│     ☐   Collectively purchased from ZZ co., ltd.       │
│                                                ,-503   │
│                                          ┌──────┐      │
│                                          │ Next │      │
│                                          └──────┘      │
└────────────────────────────────────────────────────────┘
```

FIG. 6

```
* Enter information of controller in use
  Manufacturer
  [_____▼] 601
  Type
  [_____▼] 602
  Model number
  [_____▼] 603
                        [ Next ] 604
```
600

FIG. 7

```
* Specify secondary sensor unit to be connected
  Manufacturer
  [_____▼] 701
  Type
  [_____▼] 702
  Model number
  [_____▼] 703
  ⊕ Add  704
      [ Number of devices used in sensor information is xx ] 705

* Specify beginning address for sensor information
    [ D ▼] 706   [ 8000 ] 707
                        [ Next ] 708
```
700

FIG. 8

* Is there accessory equipment?

☐ Yes  801
☐ No  802

Accessory equipment information
Manufacturer
[▼] 803

Type
[▼] 804

Model number
[▼] 805

⊕ Add  806

Number of devices used in accessory equipment information is xx  807

* Specify beginning address for accessory equipment information

| D ▼ | 9000 |
| 808 | 809 |

[Confirm] 810

FIG. 9

```
                                                    ┌─900
┌──────────────────────────────────────────────────────┐
│ ◆ Number of devices used: xx                         │
│                                                      │
│ ◆ Number of ip addresses required: yy                │
│                                                      │
│ ◆ Number of ports required: zz                       │
│                                                      │
│ ◆ Price: jpy xxxxx                                   │
│                                                      │
│ ◆ Delivery date: ww weeks from submission of information below │
│                                                      │
│ ◆ Information to be submitted: enter following information on │
│   design information entry screen                    │
│   (If product is sourced by client)                  │
│     • Individual information of secondary sensor unit│
│     • IP address of primary sensor unit              │
│     • IP address of controller                       │
│     • Port number of controller                      │
│     • Subnet mask                                    │
│     • Dashboard layout                               │
│   (If product is collectively purchased from ZZ co., ltd) │
│     • IP address for primary sensor unit             │
│     • IP address for controller                      │
│     • Port number of controller                      │
│     • Subnet mask                                    │
│     • Dashboard layout                               │
│                                                      │
│ ◆ Memory map: automatically generated after information above │
│   is entered                                         │
└──────────────────────────────────────────────────────┘
```

FIG. 10

Memory map
(When beginning address for sensor information is D8000 and beginning address for accessory equipment information is D9000)

Transmission PLC ⇒ Control PLC

Communication method: Simple CPU communication

| Sensor configuration information data | | |
|---|---|---|
| D8000 | to | D8059 |

| Sensor communication state data | | |
|---|---|---|
| D8060 | to | D8132 |

| Sensor state data | | |
|---|---|---|
| D8133 | to | D8252 |

| Secondary sensor unit monitoring data | | |
|---|---|---|
| D8253 | to | D8552 |

| Accessory equipment configuration information data | | |
|---|---|---|
| D9000 | to | D9019 |

| Accessory equipment communication state data | | |
|---|---|---|
| D9020 | to | D9033 |

| Accessory equipment if (operation information signal) | | |
|---|---|---|
| D9034 | to | D9233 |

| Accessory equipment if (command signal) | | |
|---|---|---|
| D9234 | to | D9433 |

| Accessory equipment monitoring data | | |
|---|---|---|
| D9434 | to | D9633 |

FIG. 11

```
* Set up network
* Setting of primary sensor unit
  ① Manufacturer name: [____1101____]  Model number: [____1102____]  IP: [192.168.100.1] 1103      Subnet: [255.255.255.0] 1104
  ② Manufacturer name: [_____]    Model number: [_____]    IP: [192.168.100.2]
  ③ Manufacturer name: [_____]    Model number: [_____]    IP: [192.168.100.3]

* Setting of ip address and port number of controller
  IP: [192.168.100.4] 1105   Port number: [_____] 1106

* Setting of C-BOX
  IP: [192.168.100.5] 1107            [192.168.100.6] 1108

[Next] 1109
```

*Enter individual information of secondary sensor unit

Manufacturer: [1201]  Type: [1202]  Model number: [1203]

MAC address of secondary sensor unit [1204]

Device ID [1205]

Device ID [1206]
Telegraphic code

⊕ Add [1207]

Next [1208]

1200

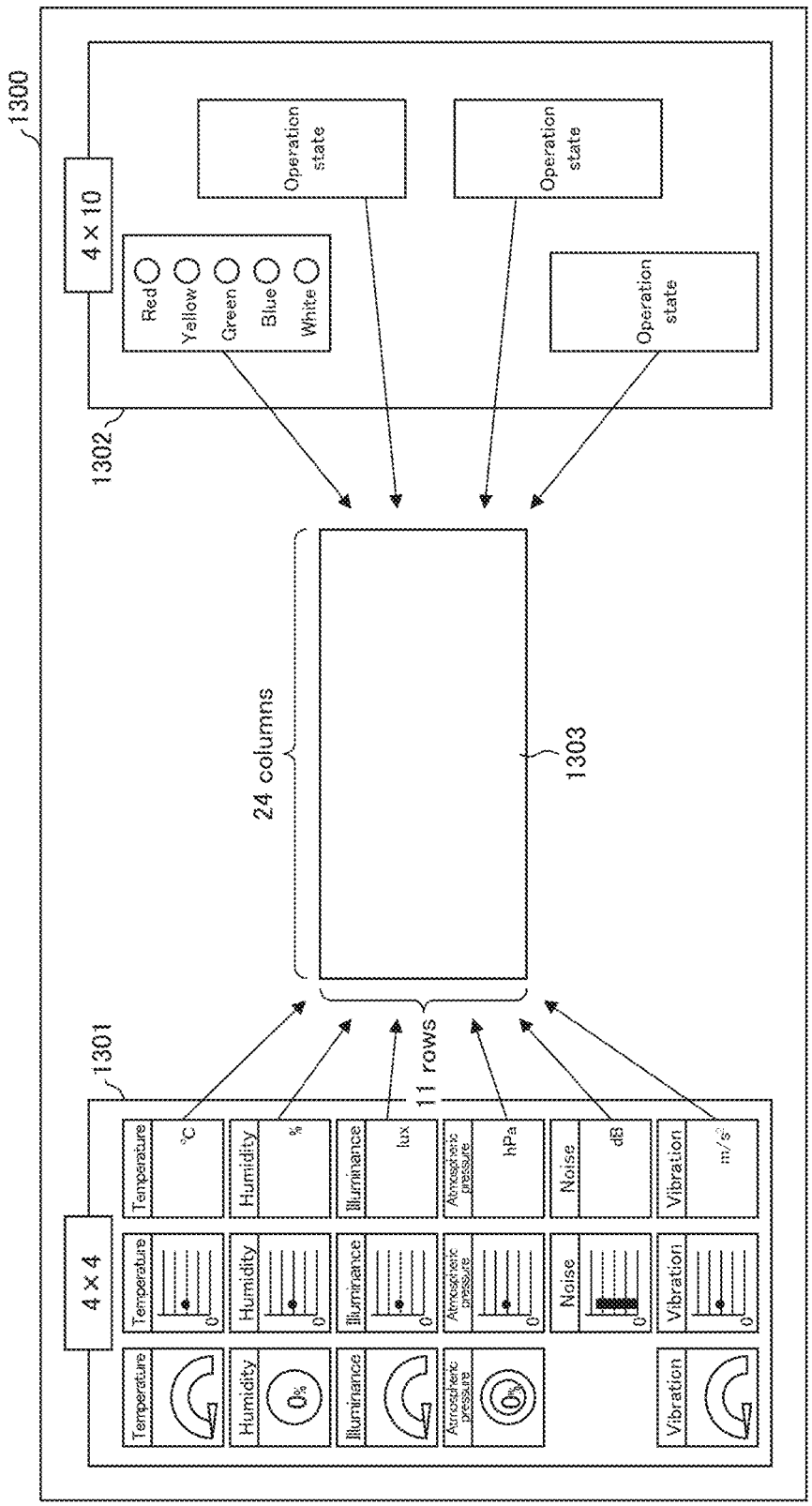

FIG. 14

```
                                                              ┌1400
┌─────────────────────────────────────────────────────────────┐
│ ◆ Number of devices used: xx                                │
│                                                             │
│ ◆ Network setting                                           │
│     Primary      Model number _____ → IP:192.168.100.1    │
│     sensor unit  Model number _____ → IP:192.168.100.2    │
│                  Model number _____ → IP:192.168.100.3    │
│     Controller   Model number _____ → IP:192.168.100.4    │
│                                        → Port number :      │
│     C-BOX  IP:192.168.100.5  192.168.100.6                  │
│                                                             │
│ ◆ Price: jpy xxxxx                                          │
│                                                             │
│ ◆ Delivery date: In ww weeks                                │
│                                                             │
│ ◆ View of dashboard layout                                  │
│   ┌─────────────────────────────────────────────────────┐   │
│   │Temperature│Humidity │Illuminance│         │         │Red ○   │
│   │           │  0%     │           │Operation│Operation│Yellow ○│
│   │           │         │           │state    │state    │Green ○ │
│   │Atmospheric│ Noise   │Vibration  │         │         │Blue ○  │
│   │pressure   │         │           │         │         │White ○ │
│   │   0%      │         │           │         │         │        │
│   └─────────────────────────────────────────────────────┘   │
└─────────────────────────────────────────────────────────────┘
```

DEVICE AND METHOD FOR SELLING INFORMATION PROCESSING DEVICE

This Nonprovisional application claims priority under 35 U.S.C. § 119 on Patent Application No. 2021-106033 filed in Japan on Jun. 25, 2021 and Patent Application No. 2021-011237 filed in Japan on Jan. 27, 2021, the entire contents of which are hereby incorporated by reference.

TECHNICAL FIELD

The present invention relates to a sales device and a sales method for selling an information processing device.

BACKGROUND ART

It is common practice to use the Internet to place and receive orders for products between companies. For example, Patent Literature 1 discloses a system that automatically manages, on the basis of usage information of pieces of equipment already connected to a network, when to replenish, replace, maintain, and upgrade the pieces of equipment.

CITATION LIST

Patent Literature

[Patent Literature 1]
Japanese Translation of PCT International Application, Tokuhyo, No. 2018-536228

SUMMARY OF INVENTION

Technical Problem

However, the conventional technology disclosed in Patent Literature 1 is for replenishment, replacement, maintenance, upgrade, and the like of existing pieces of equipment, and does not involve purchasing a new piece of accessory equipment or the like and connecting the new piece of accessory equipment or the like to the existing pieces of main equipment. Generally, when a company purchases, from another company, a new piece of accessory equipment or the like such as a sensor or a piece of accessory equipment and connects the new piece of accessory equipment or the like to an existing piece of main equipment, the company that purchases the new piece of accessory equipment or the like or a system integrator is responsible for the work of connecting the new piece of accessory equipment. However, in a case where communication design specifications of the new piece of accessory equipment or the like differs from those of the existing piece of main equipment, another device for connection or expertise is required in order to connect the new piece of accessory equipment. This is not easy for an ordinary company. As such, for the company which purchases the new piece of accessory equipment or the like, it will be convenient to be able to purchase, together with the new piece of accessory equipment or the like, an information processing device that has been set to connect the new piece of accessory equipment or the like to the existing piece of main equipment. To this end, when purchasing the information processing device, the purchaser needs to designate the new piece of accessory equipment or the like and the existing piece of main equipment to be connected to the new piece of accessory equipment or the like.

In view of the above problem, it is an objective of an aspect of the present invention to provide a sales device and a sales method for selling an information processing device for facilitating connection between a piece of accessory equipment or the like to be purchased and an existing piece of main equipment.

Solution to Problem

In order to attain the objective, a sales device in accordance with an aspect of the present invention is a sales device for selling an information processing device that is configured to collect data from at least one of a sensor and a piece of accessory equipment and provide the data to a controller included in a piece of main equipment, the sales device including a processor configured to carry out: a first process of receiving a user operation for specifying a type of the at least one of the sensor and the piece of accessory equipment; and a second process of receiving a user operation for specifying a memory area which is included in the controller and in which the data collected from the at least one of the sensor and the piece of accessory equipment specified in the first process is to be recorded.

Further, a sales method in accordance with an aspect of the present invention is a sales method for selling an information processing device that is configured to collect data from at least one of a sensor and a piece of accessory equipment and provide the data to a controller included in a piece of main equipment, the sales method including a first process and a second process which are carried out by a processor, the first process receiving a user operation for specifying a type of the at least one of the sensor and the piece of accessory equipment, the second process receiving a user operation for specifying a memory area which is included in the controller and in which the data collected from the at least one of the sensor and the piece of accessory equipment specified in the first process is to be recorded.

A sales device in accordance with each aspect of the present invention can be realized by a computer. The computer is operated based on (i) a control program for causing the computer to realize the sales device by causing the computer to operate as each section (software element) included in the sales device and (ii) a computer-readable storage medium in which the control program is stored. Such a control program and a computer-readable storage medium are included in the scope of the present invention.

Advantageous Effects of Invention

According to an aspect of the present invention, it is possible to provide a sales device and a sales method for selling an information processing device for facilitating connection between a piece of accessory equipment or the like to be purchased and an existing piece of main equipment.

BRIEF DESCRIPTION OF DRAWINGS

FIG. 4 is an example of a display screen displayed on a user terminal when a user accesses a website of a sales company that manages the sales device in accordance with Embodiment 1.

FIG. 5 is an example of a display screen for receiving a user's input operation for selecting whether the user is to source a sensor by themselves or collectively purchase the sensor.

FIG. 6 is an example of a display screen for receiving a user operation of inputting information of a controller of a piece of main equipment currently in use by the user.

FIG. 7 is an example of a display screen for receiving a user operation for designating a sensor to be connected to a network.

FIG. 8 is an example of a display screen for receiving a user operation of inputting (i) whether or not there is a piece of accessory equipment in use by the user and (ii) if yes, information of the piece of accessory equipment.

FIG. 9 is an example of a screen that displays (i) a list of what a user has inputted and (ii) information necessary for setting a relay device so as to allow a purchased piece of equipment to be connected to the Internet.

FIG. 10 is an example of a memory map generated and outputted by a sales device.

FIG. 11 is an example of a display screen for setting network-related information of a primary sensor unit and a controller, which are already in use by the user, and a relay device.

FIG. 12 is an example of a display screen, to which a transition occurs in a case where a user sources a sensor by themselves.

FIG. 13 is an example of a display screen, to which a transition occurs in a case where a sensor is purchased collectively from a manufacturer of a relay device.

FIG. 14 is a screen which collectively displays a type(s) and the number of a sensor(s) and/or a piece(s) of accessory equipment to be connected to a network, connection information such as an IP address, a layout of a monitor screen, a price, a delivery date, and the like.

DESCRIPTION OF EMBODIMENTS

Embodiment 1

Figure 1:
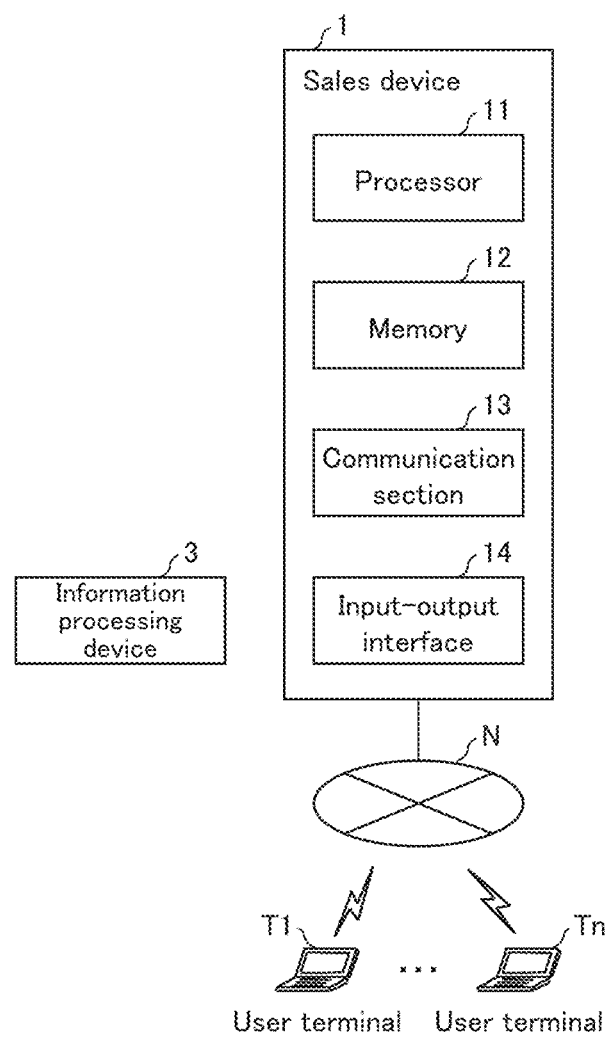
FIG. 1 is a block diagram illustrating a configuration of a sales device in accordance with Embodiment 1 of the present invention.

The following description will discuss Embodiment 1 of the present invention in detail. FIG. 1 is a block diagram illustrating a configuration of a sales device 1 in accordance with Embodiment 1. Embodiment 1 will be described with reference to the sales device 1 for selling an information processing device (relay device) with use of the Internet.

As illustrated in FIG. 1, the sales device 1 includes at least one processor 11, a memory 12, a communication section 13, and an input-output interface (I/O interface) 14. The processor 11 centrally controls the sales device 1. The memory 12 includes a primary memory and a secondary memory. The primary memory is, for example, a semiconductor random access memory (RAM). The secondary memory is, for example, a flash memory, a hard disk drive (HDD), a solid state drive (SSD), an optical disk drive (ODD), a floppy disk drive (FDD), or a combination of any of those listed above.

In Embodiment 1, the memory of the sales device 1 is realized by two memories (the primary memory and the secondary memory); however, this does not imply any limitation. That is, the memory of the sales device 1 may be realized by a single memory. In this case, for example, a certain storage area of the memory may be used as the primary memory and another storage area of the memory may be used as the secondary memory.

The processor 11 reads a sales program P1, which is stored in the secondary memory, from the secondary memory and loads the sales program P1 into the primary memory. Then, the processor 11 carries out steps included in a sales method M1 in accordance with instructions contained in the sales program P1 thus loaded. That the sales program P1 is stored in the secondary memory means that a source code or an executable file obtained by compiling the source code is stored in the secondary memory.

Further, the processor 11 reads a setting program P2, which is stored in the secondary memory, from the secondary memory and loads the setting program P2 into the primary memory. Then, the processor 11 carries out steps included in a setting method M2 in accordance with instructions contained in the setting program P2 thus loaded.

A device that can be used as the processor 11 is, for example, a central processing unit (CPU), a graphic processing unit (GPU), a digital signal processor (DSP), a micro processing unit (MPU), a floating point number processing unit (FPU), a physics processing unit (PPU), a microcontroller, or a combination of any of those listed above.

The communication section 13 of the sales device 1 is configured to have, connected thereto, a user terminal (computer) T1, . . . Tn (hereinafter referred to as a "user terminal T") in a wired manner or wirelessly over a network N. Examples of the communication section 13 include Ethernet (registered trademark) and Wi-Fi (registered trademark) interfaces, and the like. Examples of the network that can be employed include personal area network (PAN), local area network (LAN), campus area network (CAN), metropolitan area network (MAN), wide area network (WAN), global area network (GAN), and an internetwork including any of such networks. The internetwork may be an intranet, an extranet, or the Internet illustrated in FIG. 1.

Examples of the input-output interface 14 include universal serial bus (USB), advanced technology attachment (ATA), small computer system interface (SCSI), and peripheral component interconnect (PCI) interfaces, and the like. The input device connected to the input-output interface 14 can be, for example, a keyboard, a mouse, a touchpad, a microphone, or a combination of any of those listed above. The output device connected to the input-output interface 14 can be, for example, a display, a projector, a printer, a speaker, a headphone, or a combination of any of those listed above.

Note that, although Embodiment 1 employs a configuration in which a single processor 11 is used to carry out the sales method M1, the present invention is not limited to such. That is, a configuration in which a plurality of processors are used to carry out the sales method M1 may be employed. In this case, a plurality of processors which work together to carry out the sales method M1 may be provided in a single computer and configured to be communicable with each other through a bus or may be provided in a respective plurality of computers and configured to be communicable with each other over a network. For example, the following configuration can be employed: a processor contained in a computer constituting a cloud server and a processor contained in a computer owned by a user of the cloud server work together to carry out the sales method M1.

The sales device 1 is a sales device for selling the information processing device (relay device) 3 that collects data from at least one of at least one sensor and at least one piece of accessory equipment and provides the data to a controller included in a piece of main equipment. Hereinafter, "at least one sensor and/or at least one piece of accessory equipment" will be also referred to as "a sensor and/or a piece of accessory equipment". The information processing device 3 has a "linking" function, a "collecting" function, and an "informing" function. Hereinafter, the information processing device 3 will be also referred to as "relay device 3". The relay device 3 is an aspect of the "information processing device" recited in the claims.

A person in charge of the company, who is a user (purchaser), can purchase a piece of accessory equipment and/or a sensor attachable to an existing piece of main equipment, via the Internet N together with the relay device 3. That is, the user can purchase the relay device and the sensor and/or the piece of accessory equipment by inputting predetermined information into a display screen (also referred to as an "operation screen"), which is caused by the sales device 1 to be displayed on a web screen of the user terminal T on the Internet N. Alternatively, the user may purchase a new piece of main equipment and also purchase, via the Internet N, a sensor and/or a piece of accessory equipment attachable to the piece of main equipment.

Specifically, the processor 11 of the sales device 1 carries out a first process of receiving a user operation for specifying a type of at least one of a sensor and a piece of accessory equipment. The processor 11 also carries out a second process of receiving a user operation for specifying a memory area which is included in the controller and in which data collected from the at least one of the sensor and the piece of accessory equipment specified in the first process is to be recorded. The first process and the second process are carried out through the web screen on the user terminal T. A manner in which a screen for the first process or the second process is displayed is not limited. In other words, the processor 11 of the sales device 1 carries out the first process of receiving, on the user terminal T, a user operation for specifying a type of at least one of a sensor and a piece of accessory equipment. The processor 11 also carries out a second process of receiving, on the user terminal T, a user operation for specifying a memory area which is included in the controller and in which data collected from the at least one of the sensor and the piece of accessory equipment specified in the first process is to be recorded. The processor 11 of the sales device 1 may be on the cloud. Note that a specific example of the display screen, which the processor 11 causes to be displayed on the user terminal T in order to receive a user operation, will be described later.

With the configuration above of the sales device 1, it is possible to provide a sales device for selling a relay device for facilitating connection between a piece of accessory equipment or the like to be purchased and an existing main piece of equipment.

Figure 2:
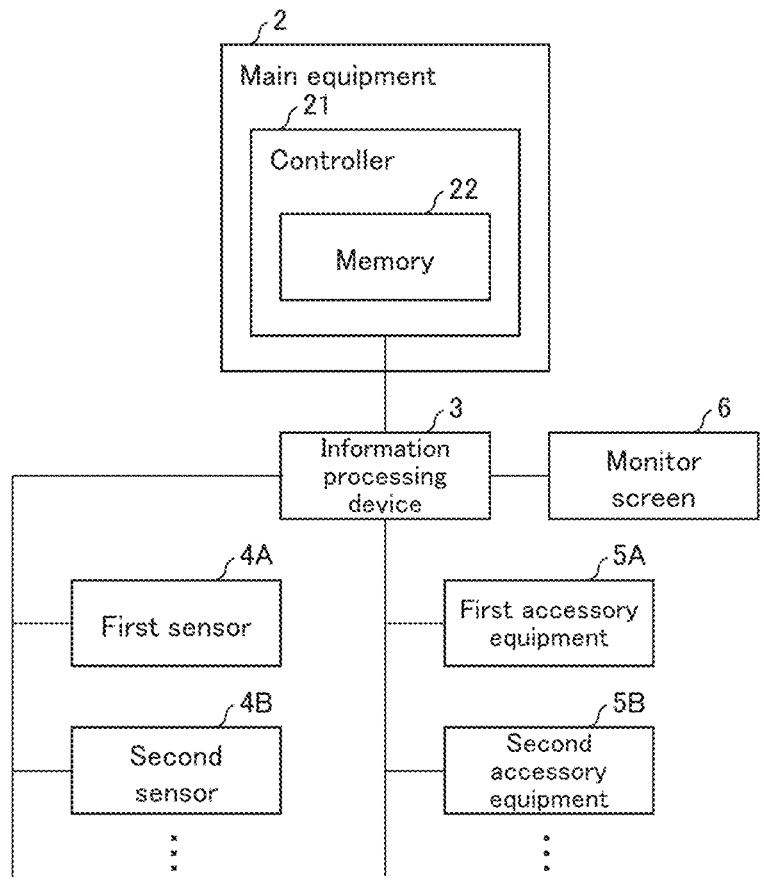
FIG. 2 is a diagram schematically illustrating a relationship between (i) a relay device in accordance with Embodiment 1 and (ii) a piece of main equipment and a sensor and/or a piece of accessory equipment.

The following description will discuss a function of the relay device 3 with reference to FIG. 2. FIG. 2 is a diagram schematically illustrating a relationship between (i) a relay device 3 in accordance with Embodiment 1 and (ii) a piece of main equipment 2 and at least one of at least one sensor 4 and at least one piece of accessory equipment 5.

The piece of main equipment 2 is a piece of equipment already in use by the user company or a piece of equipment to be newly purchased. The sensor 4 and/or the piece of accessory equipment 5 are newly purchased by the user company together with the relay device 3, for use with the piece of main equipment 2. That is, the piece of main equipment 2 and the sensor 4 and/or the piece of accessory equipment 5 are basically independently functioning and operated pieces of equipment. The relay device 3 relays information communication between the sensor 4 and/or the piece of accessory equipment 5 and the main equipment 2. Specifically, the relay device 3 has a function of collecting (obtaining) data from the sensor 4 and/or the piece of accessory equipment 5 and causing the collected data to be written into a memory 22 of a controller 21 of the main piece of equipment 2. The monitor screen 6 displays, in real time, the data collected by the relay device 3. The monitor screen 6 may be a dashboard (a display panel) or the like included in the relay device 3, or may be a display device connected to the relay device 3.

For example, the piece of main equipment 2 is a manufacturing device and is controlled by the controller 21. The sensor 4 is a first sensor (e.g., a temperature sensor) 4A, a second sensor (e.g., an open/close sensor) 4B, . . . and so on. The piece of accessory equipment 5 is a piece of first accessory equipment (e.g., a conveyor) 5A, a piece of second accessory equipment (e.g., a dust collector) 5B, . . . and so on. Note that the term "sensor 4" is used to refer to these sensors collectively regardless of the types of the sensors, and the term "piece of accessory equipment 5" is used to refer to these pieces of accessory equipment collectively regardless of the types of the pieces of accessory equipment. The relay device 3 receives sensor data from the sensor 4 and causes the sensor data to be written into the memory 22 of the controller 21. The relay device 3 receives operation data from the piece of accessory equipment 5 and causes the operation data to be written into the memory 22 of the controller 21. The operation data is, for example, an operation start time, an operation stop time, various output values of the piece of equipment, information of detected abnormality, and the like. The sensor data and the operation data may be hereinafter collectively referred to as "data".

The relay device 3 causes the data collected from the sensor 4 and/or the piece of accessory equipment 5 to be written into a predetermined memory area (memory address) in the memory 22 of the controller 21. The user who makes a purchase can specify which data to write into which memory area. The controller 21 controls the piece of main equipment 2 as needed on the basis of the data written into the memory 22. The controller 21 can control not only the piece of main equipment 2 but also the piece of accessory equipment 5 on the basis of the data written into the memory 22.

In a case where the relay device 3 collects data from the sensor 4 and/or the piece of accessory equipment 5, the data may be collected in a wired manner, or may be collected at least partially wirelessly. Wireless communication thus used can be, for example, Ethernet (registered trademark), Wi-Fi (registered trademark), or the like. Further, the relay device 3 may be configured to transmit and receive data with use of a network such as the Internet. Similarly, in a case where the relay device 3 causes data to be written into the memory 22, the data may be written in a wired manner, or may be written wirelessly.

The relay device 3 converts data collected from the sensor 4 and/or the piece of accessory equipment 5, which is manufactured by a different manufacturer, into a unified data format readable by the controller 21. Further, the relay device 3 structures the data, the data format of which has been converted, by arranging the data by time for each sensor 4 and/or each piece of accessory equipment 5. Then, the relay device 3 causes the data thus structured to be written into a specified memory area in the memory 22. Thus, the user simply designates which memory area in the memory 22 data is to be recorded by the relay device 3, and this allows the controller 21 to use data recorded in a specified memory area to carry out control as needed.

For example, retrofitting a new sensor and/or a new piece of accessory equipment to an existing piece of main equipment incurs a great deal of labor and expense in the work of connecting the piece of main equipment and the sensor and/or the piece of accessory equipment because a data format and a data communication method differ between the piece of main equipment and the sensor and/or the piece of accessory equipment. In a case where a new set of a piece of main equipment and a sensor and/or a piece of accessory equipment desired by the user is purchased by the user, the user needs to construct the set by themselves because there is no off-the-shelf set of such pieces of equipment and a sensor. As such, also in this case, a great deal of labor and expense are incurred in the work of connecting the piece of main equipment and the sensor and/or the piece of accessory equipment. By purchasing the above relay device 3 together, however, the user can easily connect, to the piece of main equipment 2, the sensor 4 and/or the piece of accessory equipment 5 to be retrofitted. Then, the user can centrally manage data from the sensor and/or the piece of accessory equipment and use the data for process control, safety control, and the like. Further, data of the sensor and/or the piece of accessory equipment can be used to cause the piece of main equipment 2 to control the piece of accessory equipment 5. In this case, the piece of main equipment 2 may control the piece of accessory equipment 5 via the relay device 3, or may control the piece of accessory equipment 5 by direct information communication with the piece of accessory equipment 5. Also in a case where a piece of main equipment 2 and a sensor 4 and/or a piece of accessory equipment 5 are newly purchased together, a similar advantage can be obtained by purchasing the relay device 3 together.

Returning to FIG. 1, the following description will discuss a function of the processor 11. The processor 11 may carry out a third process of setting the relay device 3 so that the relay device 3 causes data collected from the sensor 4 and/or the piece of accessory equipment 5, whose type has been specified in the first process, to be written into the memory area, which has been specified in the second process, in the memory 22 of the controller 21. The third process is, for example, a process in which the processor 11 (i) displays an operation screen for causing the user to input a beginning address of the memory area in which the data is to be written into, (ii) obtains information thus inputted, and (iii) sets the relay device 3 on the basis of the information. Through the third process, the sales device 1 can obtain information of the memory area in which the data collected from the sensor 4 and/or the piece of accessory equipment 5 is to be recorded. Further, the user can specify, when making a purchase, a memory area in which data is to be recorded in the memory 22. Thus, setting is made so that data transmitted from the sensor 4 and/or the piece of accessory equipment 5 which have/has been newly purchased is recorded in a predetermined area of the memory 22 by the relay device 3. As a result, the user need not carry out setting for causing the data to be recorded in the memory 22. Note that a manner in which the operation screen used in the third processing is displayed is optional. Specific examples thereof, including a manner in which an operation screen used in each process described below is displayed, will be described later.

Note that, as the third process of setting the relay device 3, the processor 11 may carry out a process of transmitting information for setting the relay device 3 to the relay device 3 via the network, or may carry out a process of causing the information to be stored in the memory 12. In the latter case, the information for setting the relay device 3 is inputted to the relay device 3 via a portable storage medium or the like. Thus, the relay device 3 is set.

The processor 11 can also carry out at least one of: a fourth process of receiving a user operation for specifying a manufacturer of the sensor 4 and/or the piece of accessory equipment 5; and a fifth process of receiving a user operation for specifying a manufacturer of the controller 21. The fourth process is, for example, a process of (i) displaying an operation screen for causing the user to input or select a name of a manufacturer of the sensor 4 and/or the piece of accessory equipment 5 and (ii) obtaining information inputted by the user. The fifth process is, for example, a process of (i) displaying an operation screen for causing the user to input or select a name of a manufacturer of the controller 21 and (ii) obtaining information inputted or selected by the user. Through the fourth process, the sales device 1 can obtain information of the sensor 4 and/or the piece of accessory equipment 5 purchased by the user. Through the fifth process, the sales device 1 can obtain information of the controller 21 of the piece of main equipment 2 owned by the user. Further, the user can easily input predetermined information.

The processor 11 may also carry out a sixth process of generating a memory map which indicates a memory area of the memory 22 of the controller 21 and data to be recorded in the memory area. Through the sixth process, the user can check (i) which memory area is to have data recorded and (ii) from which sensor 4 and/or which piece of accessory equipment 5 the data is from.

The processor 11 may also carry out a seventh process of receiving a user operation for selecting a type of product from a plurality of candidates. The seventh process is, for example, a process in which, when a name of a manufacturer is specified, types of products that are manufactured by the manufacturer are displayed in a drop-down menu on an operation screen, and information selected by the user is obtained. Through the seventh process, the user can easily specify the sensor 4 and/or the piece of accessory equipment 5 on the operation screen.

The processor 11 may carry out an eighth process of receiving a user operation for setting the monitor screen 6 of the relay device 3 so that the monitor screen 6 displays, in a predetermined layout, the data collected by the relay device 3. Along with the eighth process, the processor 11 may receive a user operation which the user carries out to designate in what manner the data collected by the relay device 3 is to be displayed.

The eighth process is, for example, a process of (i) displaying, on an operation screen, a display position representing at which position the data is to be displayed on the monitor screen 6, (ii) causing the user to select the display position, and (iii) obtaining pieces of information thus designated by the user. At this time, the processor 11 may (i) cause a plurality of manners, in each of which data is to be displayed, to be displayed on the operation screen for the respective types of data and (ii) cause the user to select a manner from among the plurality of manners. As described above, the monitor screen 6 may be a display panel incorporated in the relay device 3, or may be a display device provided separately from the relay device 3. Through the eighth process, the user can make customization such that desired data is displayed in a desired position on the monitor screen and, optionally, in a desired manner.

The eighth process may be a process of receiving a user operation for specifying an area which is displayed on the operation screen and in which the data is to be displayed on the monitor screen 6. In addition to this process, the user may be caused to specify a display pattern which indicates a manner in which the data is to be displayed. Specifically, the eighth process may be a process of (i) displaying, on the operation screen, a display pattern indicative of a manner in which the data is to be displayed and an area in which the data is to be displayed on the monitor screen 6, (ii) causing the user to specify the display pattern by dragging and dropping the display pattern, and (iii) obtaining information thus specified.

According to the sales device 1 having the above-described configuration, the processor 11 of the sales device 1 carries out the first process of receiving a user operation for specifying a type of at least one of the sensor 4 and the piece of accessory equipment 5. The processor 11 also carries out the second process of receiving a user operation for specifying a memory area which is included in the memory 22 of the controller 21 and in which data collected from the at least one of the sensor 4 and the piece of accessory equipment 5 specified in the first process is to be recorded. Thus, on the basis of information obtained by the first process and the second process, the relay device 3 can be set so as to cause data of the sensor 4 and/or the piece of accessory equipment 5 to be recorded in the memory 22 of the controller 21. Thus, it is possible to provide a sales device for selling an information processing device (relay device) for facilitating connection between a piece of accessory equipment or the like to be purchased and an existing main piece of equipment.

Sales Method

Figure 3:
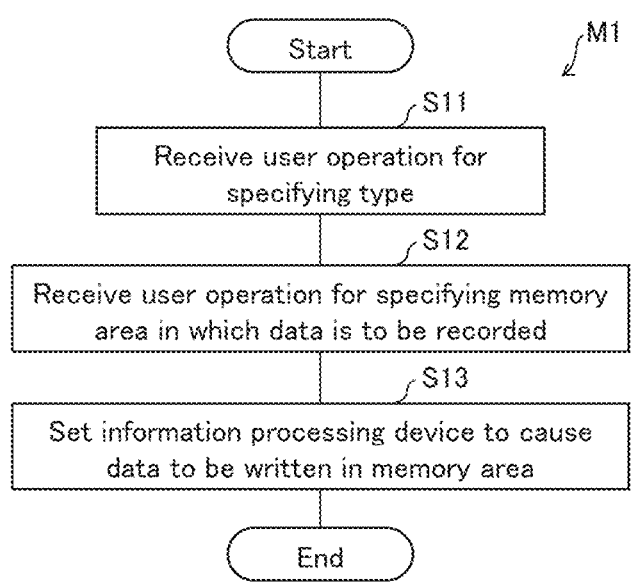
FIG. 3 is a flowchart illustrating a flow of a sales method M1 in accordance with Embodiment 1.

The following description will discuss a sales method carried out with use of the sales device 1 in accordance with Embodiment 1. FIG. 3 is a flowchart illustrating a flow of the sales method M1. The sales method M1 includes the following steps. As indicated in Step S11, the processor 11 carries out the first process of receiving a user operation for specifying a type of at least one of the sensor 4 and the piece of accessory equipment 5. Subsequently, as indicated in Step S12, the processor 11 carries out the second process of receiving a user operation for specifying a memory area which is included in the controller 21 and in which data collected from the at least one of the sensor 4 and the piece of accessory equipment 5 specified in the first process is to be recorded. As described above, a manner in which a screen for each process is displayed is not limited.

As indicated in Step S13, the processor 11 may carry out the third process of setting the relay device 3 so that the relay device 3 causes data collected from the at least one of the sensor 4 and the piece of accessory equipment 5 specified in the first process to be written into the memory area, which has been specified, in the memory 22.

Further, in the sales method carried out by the processor 11, the processor 11 may carry out any of the fourth to ninth processes described above.

According to the sales method M1 having the above configuration, the processor 11 of the sales device 1 carries out the first process of receiving a user operation for specifying a type of at least one of the sensor 4 and the piece of accessory equipment 5 and the second process of receiving a user operation for specifying a memory area which is included in the memory 22 of the controller 21 and in which data collected from the at least one of the sensor 4 and the piece of accessory equipment 5 specified in the first process is to be recorded. Thus, it is possible to provide a sales method for selling an information processing device (relay device) for facilitating connection between a piece of accessory equipment or the like to be purchased and an existing main piece of equipment.

Process of Receiving Order

The following description will discuss, with reference to drawings, a process carried out by the processor 11 of the sales device 1 of receiving an order placed by the user. FIG. 4 is an example of an operation screen (graphical user interface (GUI)) which is displayed on the user terminal T when a user accesses a website that sells the relay device 3. The website that sells the relay device 3 is a website set up on the network by a company that manages the sales device 1. The company managing the sales device 1 may be a company that manufactures the relay device 3, or a sales company that has been commissioned by the company manufacturing the relay device 3 to sell the relay device 3.

As illustrated in FIG. 4, a display screen 400 is an operation screen for receiving a user operation of inputting client information. Specifically, the display screen 400 displays a text box 401 for inputting a name of a person in charge, a text box 402 for inputting an email address, a text box 403 for re-inputting the email address for confirmation, a text box 404 for inputting a telephone number, and a text box 405 for inputting a company name. When the user clicks on a button 406 after inputting these pieces of information into the respective text boxes, the information thus inputted is transmitted to the sales device 1, and a transition to a display screen 500 as illustrated in FIG. 5 occurs.

The display screen 500 is an example of an operation screen for receiving the user's input operation for selecting whether the user is to source the sensor 4 by themselves or collectively purchase the sensor 4 from the company (indicated as "ZZ Co., Ltd." in FIG. 5) manufacturing the relay device 3. The user clicks on a button 501 in a case of sourcing the sensor 4 by themselves, and clicks on a button 502 in a case of collectively purchasing the relay device 4 from the company manufacturing the relay device 3. A condition (e.g., that an extra charge will be incurred) applied to the case where the user collectively purchases the sensor 4 may be displayed on the screen. The button 501 and the button 502 are radio buttons only one of which is selectable. When the user has finished inputting and clicks on a button 503, information thus inputted is transmitted to the sales device 1, and a transition to a display screen 600 as illustrated in FIG. 6 occurs.

The display screen 600 is an example of an operation screen for receiving a user operation of inputting information of the controller 21 of the piece of main equipment 2 currently in use by the user. The controller information is, for example, a manufacturer, a type, and a model number of the controller 21. The type is, for example, a programmable logic controller (PLC), a numerical control (NC), a personal computer (PC), or the like. The model number is a model number of the controller 21.

The above pieces of controller information can be selected from drop-down menus 601, 602, and 603, respectively. For example, when the user clicks on a drop-down button (an inverted triangular button) of the drop-down menu 601, a list of manufacturer names is shown, and the user can select one of the manufacture names. The drop-down menu 602 is configured to show, when the user selects one manufacturer from the drop-down menu 601, a list of types of controllers that are manufactured by the manufacturer. The drop-down menu 603 is configured to show, when the user selects a type, a list of model numbers of the type. The above process in which the processor 11 uses the drop-down menu 601 to receive a user operation for specifying a manufacturer of the controller 21 is an example of the fifth process described above. When the user has made all the selections and clicks on a button 604, information thus inputted is transmitted to the sales device 1, and a transition to a display screen 700 as illustrated in FIG. 7 occurs.

The display screen 700 is an example of an operation screen for receiving a user operation for designating a sensor to be connected to the network. On the display screen 700, the user specifies (i) a secondary sensor unit to be connected (a sensor to be newly added) and (ii) a beginning address in the memory 22 of the controller 21 in a case where information transmitted from each sensor is to be recorded in the memory 22. The secondary sensor unit can be specified by selecting a manufacturer displayed in a drop-down menu 701, a type displayed in a drop-down menu 702, and a model number displayed in a drop-down menu 703. In a case where there are a plurality of secondary sensor units, an add button 704 can be clicked on to select the plurality of secondary sensor units in a similar fashion. The above process in which the processor 11 uses the drop-down menu 702 to receive a user operation for specifying a type of the secondary sensor unit is examples of the first process and the seventh process described above. The above process in which the processor uses the drop-down menu 701 to receive a user operation for specifying a manufacturer of the secondary sensor unit is an example of the fourth process described above.

When the user designates a manufacturer from the drop-down menu 701, the drop-down menu 702 shows a list of types of controllers that are manufactured by the manufacturer. When the user designates a type of sensor, the drop-down menu 703 shows a list of model numbers of the type. Examples of a type of sensor include, but are not limited to, a $CO_2$ sensor, a temperature sensor, and an open/close sensor. The model number is a model number of each sensor. In accordance with the number of sensors thus designated, a display area 705 displays the number of designated sensors by a message "NUMBER OF DEVICES USED IN SENSOR INFORMATION IS XX".

Subsequently, in a case where the controller 21 has address numbers of the memory, the user designates a beginning address for sensor information. The beginning address for sensor information is information that indicates from which area in the memory 22 of the controller 21 sensor information is to be recorded in a case where the sensor information is recorded in the memory 22. This information is necessary when preparing a memory map (described later). For example, in a case where the controller 21 is a PLC, the memory area is defined by an alphabetic letter and numbers. In this case, the user selects the first alphabetic letter from a drop-down menu 706 and input numbers in a text box 707. FIG. 7 illustrates a case in which the beginning address for sensor information in the memory 22 is D8000. That is, the user clicks on a drop-down button (an inverted triangular button) of the drop-down menu 706 to select an alphabetic letter "D". The user then inputs, in the text box 707, a number "8000" of the address in the memory 22. The above process in which the processor 11 uses the display screen 700 to receive a user operation for specifying a memory area in the memory 22, in which memory area data collected by the processor 11 from the secondary sensor unit is to be recorded, is an example of the second process described above. When the user has finished inputting and clicks on a button 708, information thus inputted is transmitted to the sales device 1, and a transition to a display screen 800 as illustrated in FIG. 8 occurs. In a case where the controller 21 does not have address numbers of the memory, it is not necessary to carry out this input process.

The display screen 800 is an example of an operation screen for receiving a user operation of inputting (i) whether or not there is a piece of accessory equipment in use by the user and (ii) if yes, information of the piece of accessory equipment. First, the user selects whether or not there is a piece of accessory equipment. In a case where there is a piece of accessory equipment, the user clicks on a button 801. If there is not a piece of accessory equipment, the user clicks on a button 802. Clicking on the button 801 causes items of accessory equipment information to be displayed in a selectable manner. That is, clicking on the button 801 causes drop-down menu buttons 803, 804, and 805 and an add button 806, which are not selectable and are displayed in a light color in FIG. 8, to be displayed in a selectable manner (in a dark color). The user can select a manufacturer, a type, and a model number of the piece of accessory equipment. Further, in a case of selecting a plurality of pieces of accessory equipment, the user clicks on the add button 806 and repeats selecting. In accordance with the number of sensors thus selected, a display area 807 displays the number of sensors such that "NUMBER OF DEVICES USED IN ACCESSORY EQUIPMENT INFORMATION IS XX". The above process in which the processor 11 uses the drop-down menu 804 to receive a user operation for specifying a type of the piece of accessory equipment is examples of the first process and the seventh process described above. The above process in which the processor 11 uses the drop-down menu 803 to receive a user operation for specifying a manufacturer of the piece of accessory equipment is an example of the fourth process described above.

Subsequently, in a case where the controller 21 has address numbers of the memory, the user designates a beginning address for accessory equipment information. The beginning address for accessory equipment information is information that indicates from which area in the memory 22 of the controller 21 information obtained from a piece of accessory equipment is to be recorded when the information is recorded in the memory 22. This information is necessary when preparing a memory map (described later). As described above, in a case where the controller 21 is a PLC, the memory area is defined by an alphabetic letter and numbers. FIG. 8 illustrates a case in which the beginning address for accessory equipment information in the memory 22 is D9000. That is, the user clicks on a drop-down button (an inverted triangular button) of a drop-down menu 808 to select an alphabetic letter "D". The user then inputs, in a text box 809, a number "9000" of the address in the memory 22. The above process in which the processor 11 uses the display screen 800 to receive a user operation for specifying a memory area in the memory 22, in which memory area data collected from the piece of accessory equipment is to be recorded, is an example of the second process described above. When the user has finished inputting and clicks on a button 810, information thus inputted is transmitted to the sales device 1, and a transition to a display screen 900 as illustrated in FIG. 9 occurs. In a case where the controller 21 does not have address numbers of the memory, it is not necessary to carry out this input process.

The display screen 900 is an example of a screen that displays (i) a list of what the user has inputted and (ii) information necessary for setting the relay device 3 so as to allow a purchased piece of equipment to be connected to the Internet. In the display screen 900, "number of devices used", "number of IP addresses required", "number of ports required", "price", and "delivery date" are sums of information inputted by the user and an estimated cost and delivery date which are based on the sums. In the display screen 900, information presented after the message "INFORMATION TO BE SUBMITTED: ENTER FOLLOWING INFORMATION ON DESIGN INFORMATION ENTRY SCREEN" is necessary information which the user must input in order to carry out the setting of the relay device 3. The necessary information differs between a case in which the user sources the sensor by themselves and a case in which the user collectively purchases the sensor from the company (ZZ Co., Ltd.) manufacturing the relay device 3. Further, a message is displayed which indicates that a memory map will be generated on the basis of order entries inputted up to the display screen 800.

FIG. 10 is an example of a memory map 1000 generated and outputted by the sales device 1 (processor 11). The memory map is a list indicating in which memory area (memory address) in the memory 22 of the controller 21 data collected from the sensor 4 and/or the piece of accessory equipment 5 is to be recorded. With use of the information of the beginning address for sensor information specified by the user on the display screen 700 and the information of the beginning address for accessory equipment information inputted by the user on the display screen 800, the processor 11 sets the relay device 3 so that the relay device 3 causes data collected from at least one of the sensor and the piece of accessory equipment to be written into the specified memory area. This process is an example of the third process described above. The above process in which the processor 11 generates the memory map 1000 indicating a memory area in the controller 21 and data to be recorded in the memory area is an example of the sixth process described above. Further, the processor 11 may output the memory map 1000 thus generated to a display, a printer, or the like. The memory map 1000 may be written in an instruction manual of the relay device 3.

For example, in a case where "D8000" is inputted as the beginning address for sensor information on the display screen 700 and "D9000" is inputted as the beginning address for accessory equipment information in the display screen 800, the sales device 1 carries out setting so that the relay device 3 causes predetermined data to be recorded from that memory address.

Specifically, as illustrated in FIG. 10, the sales device 1 sets the relay device 3 so that the relay device 3 causes "sensor configuration information data" to be recorded in the memory addresses of D8000 to D8059, "sensor communication state data" to be recorded in the memory addresses of D8060 to D8132, "sensor state data" to be recorded in the memory addresses of D8133 to D8252, and "secondary sensor unit monitoring data" to be recorded in the memory addresses of D8253 to D8552. Further, the sales device 1 sets the relay device 3 so that the relay device 3 causes "accessory equipment configuration information data" to be recorded in the memory addresses of D9000 to D9019, "accessory equipment communication state data" to be recorded in the memory addresses of D9020 to D9033, "accessory equipment IF (operation information signal)" to be recorded in the memory addresses of D9034 to D9233, "accessory equipment IF (command signal)" to be recorded in the memory addresses of D9234 to D9433, and "accessory equipment monitoring data" to be recorded in the memory addresses of D9434 to D9633.

As described above, the sales device 1 carries out a process of receiving a user operation in order to obtain order details, and an output process based on information thus obtained. The display of screens illustrated are merely examples, and there is no limitation on a manner (displayed items, content, a method of causing the user to carry out inputting or selection, a display position, a display order, a hierarchical structure of display, and the like) in which the screens are displayed. The above examples of operation screens have been described on the assumption that the piece of main equipment 2 is owned by the user and that no piece of main equipment is newly purchased. Note, however, that an operation screen can be displayed which allows the user to input whether or not to purchase a piece of main equipment together with a piece of accessory equipment.

With reference to drawings, the following description will discuss an example of a process carried out by the sales device 1 of receiving a user operation in order to obtain setting information of the relay device 3 and an example of an output process carried out by the sales device 1 on the basis of information thus obtained. The setting information is information for connecting the sensor 4 and/or the piece of accessory equipment 5 to the Internet and information of the user's intended display layout of the monitor screen 6.

The display screen 1100 illustrated in FIG. 11 is an example of an operation screen for setting network-related information of a primary sensor unit and the controller 21, which are already in use by the user, and the relay device 3. Items inputted by the user on the display screen 1100 are a name of a manufacturer of the primary sensor unit and a model number of the primary sensor unit. Specifically, the user inputs information in an input area 1101 for inputting a manufacturer name and an input area 1102 for inputting a model number in an item that reads "SETTING OF PRIMARY SENSOR UNIT". In FIG. 11, up to three primary sensor units can be inputted. Note that an add button for adding a primary sensor unit may be provided. An IP address of the primary sensor unit is pre-assigned and displayed in an area 1103 by default. Note that the address displayed by default may be changed as necessary. Further, a subnet of the IP address is displayed in an area 1104 by default. Only one subnet is displayed because it is assumed that the subnet is shared by the IP addresses of the primary sensor unit, the controller, and a C-BOX.

The user inputs a port number in an input area 1106 for inputting a port number in an item that reads "SETTING OF IP ADDRESS AND PORT NUMBER OF CONTROLLER". In FIG. 11, the number of input areas 1106 is four, but this number increases or decreases according to the number of primary sensor units. In an area 1105 for IP address, a pre-assigned IP address is displayed by default. In areas 1107 and 1108 for IP address in an item that reads "SETTING OF C-BOX", pre-assigned IP addresses of C-BOX are displayed by default. "C-BOX" is an example of a product name of the relay device 3. In the example illustrated in FIG. 11, two areas for an IP address of C-BOX are displayed. This is an example in a case where both a sensor and a piece of accessory equipment are purchased. In a case where only one of a sensor and a piece of accessory equipment is purchased, only one IP address of C-BOX is displayed.

When the user has finished inputting and clicks on a button 1109, information thus inputted is transmitted to the sales device 1, and a transition to the next display screen occurs. The next display screen varies depending on whether the user is to source the sensor by themselves or collectively purchase the sensor from the manufacturer of the relay device 3. FIG. 12 is an example of a display screen 1200, to which the transition occurs in a case where the user sources the sensor by themselves. FIG. 13 is an example of a display screen 1300, to which the transition occurs in a case where the sensor is purchased collectively from the manufacturer of the relay device 3.

On the display screen 1200, to which the transition occurs in a case where the user sources the sensor by themselves, the user inputs a manufacturer, a type, and a model number of the sensor (secondary sensor unit) sourced by the user themselves in input areas 1201, 1202, and 1203, respectively. A communication method of the sensor is determined by the model number which has been inputted. As such, any of input areas 1204 and 1205 for inputting an ID number for communication is displayed. In a case where there are a plurality of secondary sensor units, an add button 1207 can be clicked on to display the next input area. When the user has finished all inputting and clicks on a button 1208, information thus inputted is transmitted to the sales device 1, and a transition to a display screen 1300 as illustrated in FIG. 13 occurs.

The display screen 1300 illustrated in FIG. 13 is a display screen for receiving a user operation in which the user sets a display layout of the monitor screen 6 of the relay device 3. A view 1303 of sections is provided at the center of the display screen 1300, which view simulates the monitor screen 6. Types of data to be displayed and example display 1301 of such data are provided in a left part of the display screen 1300. Example display 1302 of an operation state received from the sensor or the piece of accessory equipment is provided in a right part of the display screen 1300.

The view 1303 of sections is a view of sections obtained by dividing the monitor screen 6 so that square unit sections are arranged in 24 columns by 11 rows. The following display patterns can be placed at any positions in this divided area.

In the example display 1301 of data, 17 display patterns each having a size of 4 columns×4 rows are provided. In the uppermost stage, provided are three patterns for displaying a temperature, among which the pattern on the left is in meter format, the pattern in the center is in graph format, and the pattern on the right is in digital value format. In the second stage, provided are three patterns for displaying a humidity, among which the pattern on the left is in meter format, the pattern in the center is in graph format, and the pattern on the right is in digital value format. Likewise, patterns for illuminance are provided in the third stage, patterns for atmospheric pressure are provided in the fourth stage, patterns for noise are provided in the fifth stage, and patterns for vibration are provided in the sixth stage.

In the example display 1302 of an operation state, four display patterns each having a size of 4 columns×10 rows are provided. These patterns provided include (i) a pattern that displays, on a monitor, information pertaining to a state of communication with the sensor or the piece of accessory equipment, a power supply voltage of the sensor or the piece of accessory equipment, and an intensity of received radio waves and (ii) an indicator pattern that displays, by a color, a state of the sensor or the piece of accessory equipment. The indicator pattern is set so that, for example, a green light lights up when there is no abnormality, a yellow light lights up when the state of communication is poor, and a red light lights up when there is an abnormality in the power supply voltage or measured data.

The user selects a display pattern of data to be displayed on the monitor screen 6 from the example display 1301 of data, and drags and drops the display pattern to a position where the display pattern is to be displayed in the view 1303 of sections. Since the display pattern has a size of 4 columns×4 rows, the display pattern can be placed in an area of that size at any position. Further, the user can designate data to be monitored regarding the state of communication or whether or not there is an abnormality of data, select a display pattern from the example display 1302 of an operation state, and drag and drop the display pattern to a position where the display pattern is to be displayed in the view 1303 of sections. Since any display pattern can be positioned at an empty position in the view 1303 of sections, the user can freely decide which data is to be displayed in what layout. It should be noted that the example display 1301 of data, the example display 1302 of an operation state, and the view 1303 of sections described above are examples and do not imply any limitation. The above process of receiving a user operation is an example of the eighth process described above.

When the user finishes designing a layout for the monitor screen 6, the processor 11 displays an output screen 1400 illustrated in FIG. 14. The output screen 1400 is an example of a screen showing a list in which design information of the relay device 3 is summarized. Specifically, the output screen 1400 is a screen for collectively displaying or outputting, to the user, a type(s) and the number of a sensor(s) and/or a piece(s) of accessory equipment to be connected to the network, connection information such as an IP address, a layout of the monitor screen, a price, a delivery date, and the like.

Further Effect of Information Processing Device and Sales Method Thereof

Figure 15:
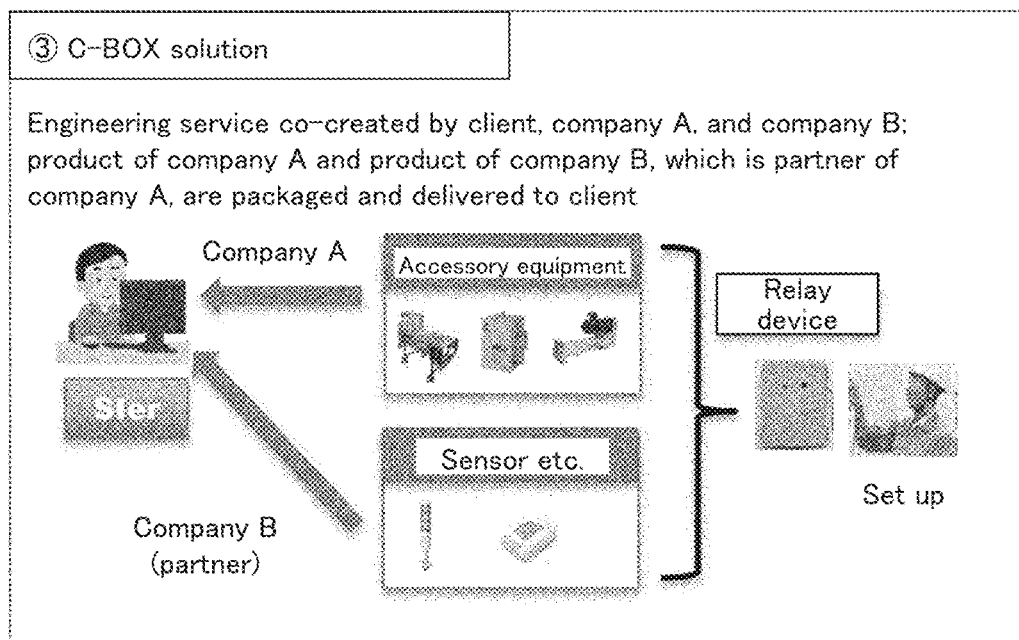
FIG. 15 is a conceptual diagram illustrating a sales method for selling an information processing device.

The following description will discuss a case in which, in Embodiment 1 described above, a piece of accessory equipment (e.g., a conveyor, a dust collector, or an electric cylinder) is manufactured by company A, and a sensor or the like is manufactured by company B, as illustrated in FIG. 15. In this case, an information processing device (a relay device), which has been set up so as to construct a production system together with both the piece of accessory equipment manufactured by company A and the sensor or the like manufactured by company B, is provided to a system integrator (SIer). This makes it possible to provide an engineering service co-created by the system integrator, company A, and company B.

In Embodiment 1, the processor 11 of the sales device 1 has been described as receiving, as the first process or the second process, a user operation at the user terminal T. However, the present invention is not limited to this. For example, the processor 11 may receive, as the first process or the second process, a user operation via an input device connected to the input-output interface 14. In this case, the processor 11 displays a screen for the first process or the second process on a display connected to the input-output interface 14.

Supplementary Note

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: sales device
2: main equipment

3: information processing device (relay device)
4: sensor
5: accessory equipment
6: monitor screen
11: processor
12: memory
13: communication section

The invention claimed is:

1. A sales device for selling an information processing device that is a relay device configured to collect data from at least one of a sensor and a piece of accessory equipment being purchased by a user and provide the data to a controller included in a piece of main equipment of the user, the at least one of the sensor and the piece of accessory equipment functioning and being operated independently of the piece of main equipment, the sales device comprising a processor configured to carry out:

a first process of causing a user terminal to display an operation screen for receiving a user operation for specifying a type of the at least one of the sensor and the piece of accessory equipment being purchased by the user;

a fourth process of receiving a user operation for specifying a manufacturer of the at least one of the sensor and the piece of the accessory equipment;

a fifth process of receiving a user operation for specifying a manufacturer of the controller of the piece of main equipment;

a second process of causing the user terminal to display an operation screen for receiving a user operation for specifying a memory area which is included in the controller of the piece of main equipment of the user and in which the data collected from the at least one of the sensor and the piece of accessory equipment specified in the first process is to be recorded;

facilitating connection and operation between the at least one of the sensor and the piece of accessory equipment with the piece of main equipment via a third process of configuring the information processing device so that the information processing device causes the data collected from the at least one of the sensor and the piece of accessory equipment, whose type has been specified in the first process and the manufacturer of the at least one of the sensor and the piece of accessory equipment which has been specified in the fourth process, to be converted into a unified data format readable by the controller of the piece of main equipment specified in the fifth process and to be written into the memory area of the controller specified in the second process.

2. The sales device as set forth in claim 1, wherein the processor is configured to carry out a sixth process of generating a memory map which indicates: the memory area of the controller; and the data to be recorded in the memory area.

3. The sales device as set forth in claim 1, wherein the processor is configured to carry out a seventh process of receiving a user operation for selecting a product of the type from among a plurality of candidates.

4. The sales device as set forth in claim 1, wherein the processor is configured to carry out an eighth process of receiving a user operation for setting a monitor screen of the information processing device so that the data collected by the information processing device is displayed on the monitor screen in a predetermined layout.

5. A sales method for selling an information processing device that is a relay device configured to collect data from at least one of a sensor and a piece of accessory equipment being purchased by a user and provide the data to a controller included in a piece of main equipment of the user, the at least one of the sensor and the piece of accessory equipment functioning and being operated independently of the piece of main equipment, the sales method comprising the following processes which are carried out by the processor;

a first process of causing a user terminal to display an operation screen for receiving a user operation for specifying a type of the at least one of the sensor and the piece of accessory equipment being purchased by the user;

a fourth process of receiving a user operation for specifying a manufacturer of the at least one of the sensor and the piece of the accessory equipment;

a fifth process of receiving a user operation for specifying a manufacturer of the controller of the piece of main equipment;

a second process causing the user terminal to display an operation screen for receiving a user operation for specifying a memory area which is included in the controller of the piece of main equipment of the user and in which the data collected from the at least one of the sensor and the piece of accessory equipment specified in the first process is to be recorded;

facilitating connection and operation between the at least one of the sensor and the piece of accessory equipment with the piece of main equipment via a third process setting the information processing device so that the information processing device causes the data collected from the at least one of the sensor and the piece of accessory equipment, whose type has been specified in the first process and the manufacturer of the at least one of the sensor and the piece of accessory equipment which has been specified in the fourth process, to be converted into a unified data format readable by the controller of the piece of main equipment specified in the fifth process and to be written into the memory area of the controller specified in the second process.

* * * * *